United States Patent [19]
Stroyan

[11] Patent Number: 5,923,333
[45] Date of Patent: Jul. 13, 1999

[54] FAST ALPHA TRANSPARENCY RENDERING METHOD

[75] Inventor: Howard D. Stroyan, Ft. Collins, Colo.

[73] Assignee: Hewlett Packard Company, Palo Alto, Calif.

[21] Appl. No.: 08/778,858

[22] Filed: Jan. 6, 1997

[51] Int. Cl.⁶ .................................................. G06F 15/00
[52] U.S. Cl. ............................................................ 345/422
[58] Field of Search ..................................... 345/422, 421, 345/419, 113, 114

[56] References Cited

U.S. PATENT DOCUMENTS

| | | | |
|---|---|---|---|
| 4,475,104 | 10/1984 | Shen | 340/729 |
| 5,220,646 | 6/1993 | Fossum | 395/122 |
| 5,293,467 | 3/1994 | Buchner et al. | 395/122 |
| 5,596,686 | 1/1997 | Duluk, Jr. | 395/122 |

OTHER PUBLICATIONS

Foley, J., vanDam, A., Feiner, S., Hughes, J., *Computer Graphics, Principles and Practice*, Second Edition, Addison–Wesley Publishing Company, Inc., 1990, pp. 663–695, 754–756.

*Primary Examiner*—Phu K. Nguyen

[57] ABSTRACT

A fast method for rendering opaque and transparent objects that produces a higher quality image at a greater speed for a given level of hardware support. Opaque objects are rendered first utilizing the z-buffer as a solids only depth buffer. Transparent objects are then rendered in multiple passes. Transparent objects are processed in a back to front order to eliminate surface anomalies. The z-buffer is utilized in an alternative mode so that the front-most surfaces of objects in a scene are processed last. Back-facing primitives of transparent objects are rendered and alpha blended first and then the front-facing primitives are rendered and alpha blended second.

4 Claims, 7 Drawing Sheets

FAST ALPHA TRANSPARENCY RENDERING METHOD

FIELD OF THE INVENTION

This invention relates to computer systems, and more particularly to graphic display of objects within computer systems. Even more particularly, the invention relates to a method for rendering transparent objects in graphic displays within computer systems.

BACKGROUND OF THE INVENTION

Current computer users demand more sophisticated graphic display capabilities for computer applications than in previous years. As the field has developed, many methods and innovations have been made to meet these growing user demands. There often is a leap-frogging of development between software capabilities and machine capabilities. Any advance in one or the other may allow for an increase in performance and visual quality which can be balanced against the costs associated with the improvements. Increases in hardware technology, processing speed, and computer memory have made possible increased graphic quality and time to render that heretofore were not acceptable, either in terms of the cost of the hardware required or the inordinate amount of time necessary to render images. Likewise, software developments have also led to improved quality and performance.

Rendering transparent objects has been a particularly difficult problem in computer graphics. In general, rendering opaque objects in a three dimensional scene is accomplished through the use of various algorithms. The z-buffer algorithm is typical.

In the z-buffer algorithm, a frame buffer stores color values for each pixel and a z-buffer stores a depth, or z-value, for each pixel. In the first step, the frame buffer is initialized to the background color and the z-buffer is initialized to 0. Second, objects are rasterized and sent to the frame buffer in arbitrary order, usually in the order in which they are encountered from the data received. The z-buffer, having corresponding entries with the frame buffer, stores a z-value for each pixel. The z-value for a pixel indicates whether the pixel of an object is in front or behind another object with respect to a given viewpoint, which is typically the screen of the graphic display. If the pixel being scan converted in the rasterization process is closer to the viewer than the current values in the buffers, then the new pixel's color and depth values replace the old values in the frame buffer and z-buffer. The result is that with opaque objects, a first opaque object behind a second opaque object will not be rendered since the first opaque object would be hidden by the second opaque object when viewed from the front of the screen. This methodology breaks down, however, with transparent objects. Even if a transparent object is in front of another transparent object or an opaque object, the components of both will need to be blended for rendering.

Visible surface list priority algorithms determine a visibility ordering of objects in a scene. Objects in a scene are sorted, typically by their z-values, and then sent to the frame buffer in sort order. A correct image results if objects are rendered in this sorted order.

Visible surface list priority algorithms have been adapted to incorporate transparent objects. An example is the Painter's Algorithm, which is a depth sort algorithm. Utilizing the z-buffer to hold a depth value for each object, objects are rasterized and sorted in a back to front order. Where an object's z-value overlaps with another object's z-value, ambiguities are resolved by recursively splitting objects into parts and sorting the parts in back to front order based on z-values. Finally, pixel values for each object or part of an object are sent to the frame buffer in the established back to front order.

The problem of introducing transparent objects into such algorithms has been addressed in several ways. In the screen-door transparency method, only some of the pixels associated with a transparent object are utilized, creating a mesh. The bits associated with a pixel's (x, y) address are used to index a transparency bit mask. If the indexed bit of the mask is 1, the pixel is utilized. If not, the pixel is not utilized, and the next lowest object at that pixel location is utilized instead. The fewer 1 bits in the bit mask, the more transparent the object will appear. With this approach, there is no blending of color values. The aggregation over a number of pixels of the bit mask effect allows the viewer's eyes to perform spatial integration to produce an interpolated transparency. However, this method does not produce a quality image and it is not very pleasing to the eye.

Another approach utilizes a blending methodology. Each pixel of each object in a scene has an alpha value ranging from 0 to 1. An alpha value of 0 for a pixel indicates that the pixel is totally opaque, whereas an alpha value of 1 indicates that the pixel is totally transparent. The shade of a screen pixel that represents a view through one or more transparent surfaces, or an opaque surface and one or more transparent surfaces, is linearly interpolated from the individual shades of the surfaces themselves. To obtain the most correct result, the blending should take place in a strict back to front order. If this back to front order is not followed, the result will be a wrong color on a shape or portion of an object in the scene.

Another approach is to render transparent objects in a scene last, combining their colors with the colors already in the frame buffer. However, because the z-buffer is not modified in this method, when two transparent objects overlap, their depth in relation to each other is not taken into account. If they are rendered in front to back order, instead of back to front, the result will be incorrect colors.

Still another method of rendering transparent objects in a proper back to front order in z-buffer-based systems involves multiple rendering passes and increased memory. First, all opaque objects are rendered using the z-buffer. Then, transparent objects are processed into a separate set of buffers that contain an alpha value, color, z-value, and a flag bit, which is initially set to off. Then z-values are compared. If the pixel for a transparent object has a z-value closer to the viewer than the z-value in the opaque z-buffer, but more distant than the z-value in the transparent z-buffer, then the flag bit is set and the color, z-value and transparency are saved in the transparent buffers. This procedure is followed for all transparent objects. Then, the information for the most distant transparent object is blended with that in the original frame buffer and z-buffer. The transparency z-value of a flagged pixel replaces that in the opaque z-buffer and the flag bit is reset. This process is repeated to render the next closest object at each pixel until done.

Utilizing such a strict back to front ordering method, however, is very expensive with respect to machine requirements and the time it takes to render objects in a scene. The hardware costs may be prohibitive for some applications. Also, the time required to render the scene may be unacceptable to a user, such as in CAD/CAM applications, where a scene must be rendered and updated quickly to maintain user interactivity and productivity.

Another problem encountered in rendering transparent objects, besides the order individual objects are rendered, is the way in which the individual transparent object itself is processed. For example, to render a transparent three dimensional object, such as a sphere, the sphere is broken down into a series of polygons, referred to in the art as primitives, which are processed from primitive to primitive around the entire sphere. Each primitive has a surface normal pointing outward from a surface of the primitive. The problem is, as the primitives are traversed around the sphere, they are processed in a front to back order for one-half of the sphere, but in the opposite order for the second half of the sphere. This produces an incorrect color in the buffer, which results in a visual flaw. Instead of a smooth surface, the object has a break in appearance due to the correct and incorrect ordering for each half of the sphere.

It is thus apparent that there is a need in the art for an improved method of rendering transparent objects for graphic display which produces a higher quality image at a speed that is acceptable to the user for the given application and that does not require increased expense in the hardware necessary to run the application. There is also a need to process individual transparent objects in a back to front order to eliminate surface anomalies. The present invention meets these and other needs in the art.

SUMMARY OF THE INVENTION

It is an aspect of the present invention to quickly render opaque and transparent objects, or transparent objects only, in a scene for graphic display.

It is another aspect of the invention to produce a high quality image of a scene containing transparent objects for graphic display.

Yet another aspect of the invention is to process the primitives of each transparent object in a back to front order to eliminate the appearance of a break in continuity on the surface of the object.

Still another aspect of the invention is to process the front surfaces of any objects last to obtain a more correct image for graphic display.

A further aspect of the invention is to utilize the z-buffer to process the front surfaces of objects last in a scene.

A still further aspect of the invention is to use the z-buffer as a depth buffer only for opaque objects, thus processing opaque objects first and then overlaying transparent objects on top of the opaque objects.

The above and other aspects of the invention are accomplished in a scene rendering method that first rasterizes and alpha blends all back-facing primitives of a transparent object, and then rasterizes and alpha blends all front-facing primitives of the transparent object. This prevents the appearance of breaks in the surface continuity of the object when displayed.

Another embodiment of the invention utilizes the z-buffer as a depth buffer for opaque objects for processing all opaque objects in a scene first, and then overlaying any transparent objects on top of the opaque objects.

A still further embodiment of the invention utilizes the z-buffer to create a depth image of all of the front-most primitives of the objects in a scene. Next, all primitives that have z-values less than the z-values in the z-buffer are processed and sent to the frame buffer. Finally, all primitives that have z-values equal to the z-values in the z-buffer are processed and sent to the frame buffer. Thus, the front-most surfaces of objects in a scene are processed last giving a more correct image for graphic display.

BRIEF DESCRIPTION OF THE DRAWINGS

The above and other aspects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
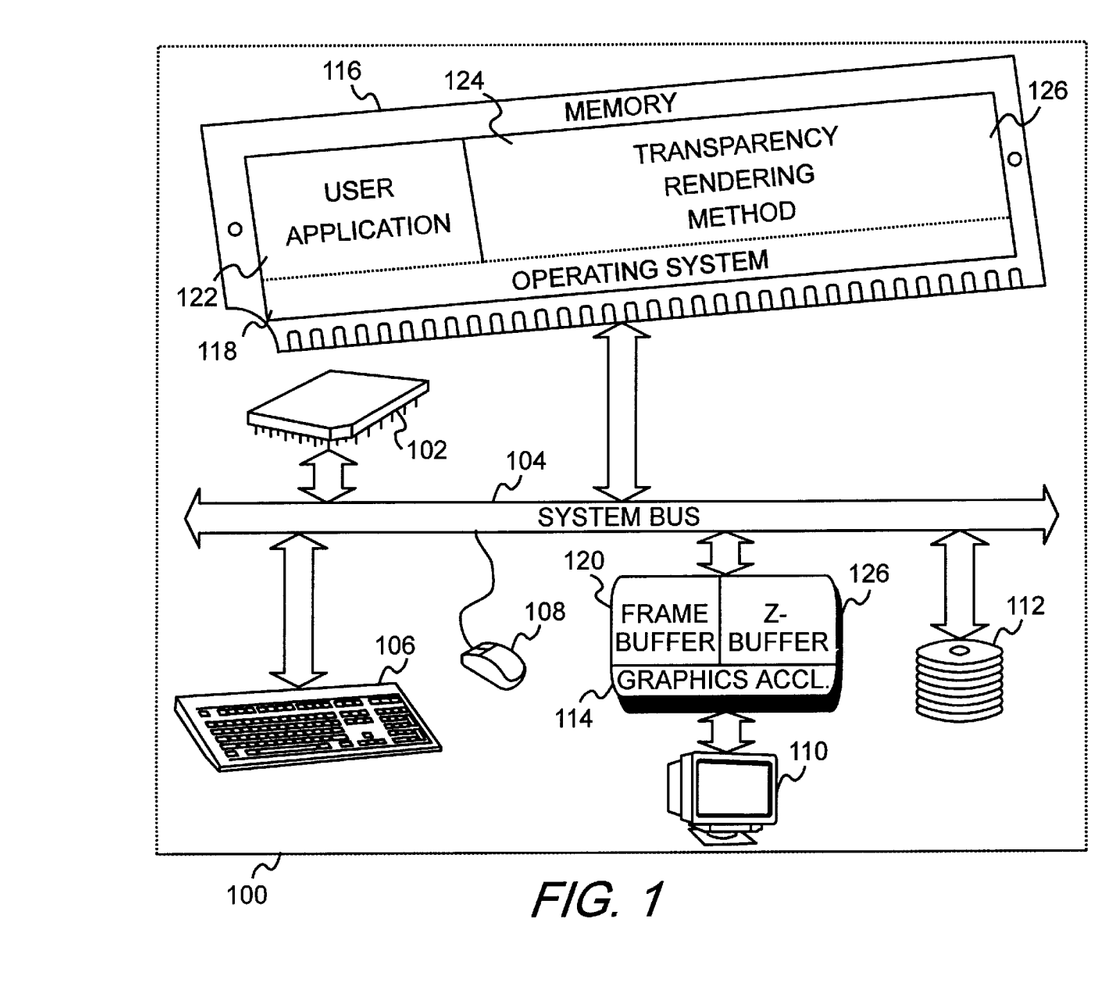
FIG. 1 shows a block diagram of a computer system incorporating the present invention.

FIG. 1 shows a block diagram of a computer system incorporating the present invention. Referring now to FIG. 1, a computer system 100 contains a processing element 102. The processing element 102 communicates to other elements of the computer system 100 over a system bus 104. A keyboard 106 allows a user to input information into the computer system 100. A graphics accelerator 114 has a z-buffer 126 and a frame buffer 120. The frame buffer 120 contains the data being displayed on graphics display 110, allowing the computer system 100 to output information to the user. A mouse 108 is also used to input information and a storage device 112 is used to store data and programs within the computer system 100. A memory 116, also attached to the system bus 104, contains an operating system 118, user application 122, and a transparency rendering method 124 of the present invention. The transparency rendering method 124 utilizes the z-buffer 126 of graphics accelerator 114.

Figure 2:
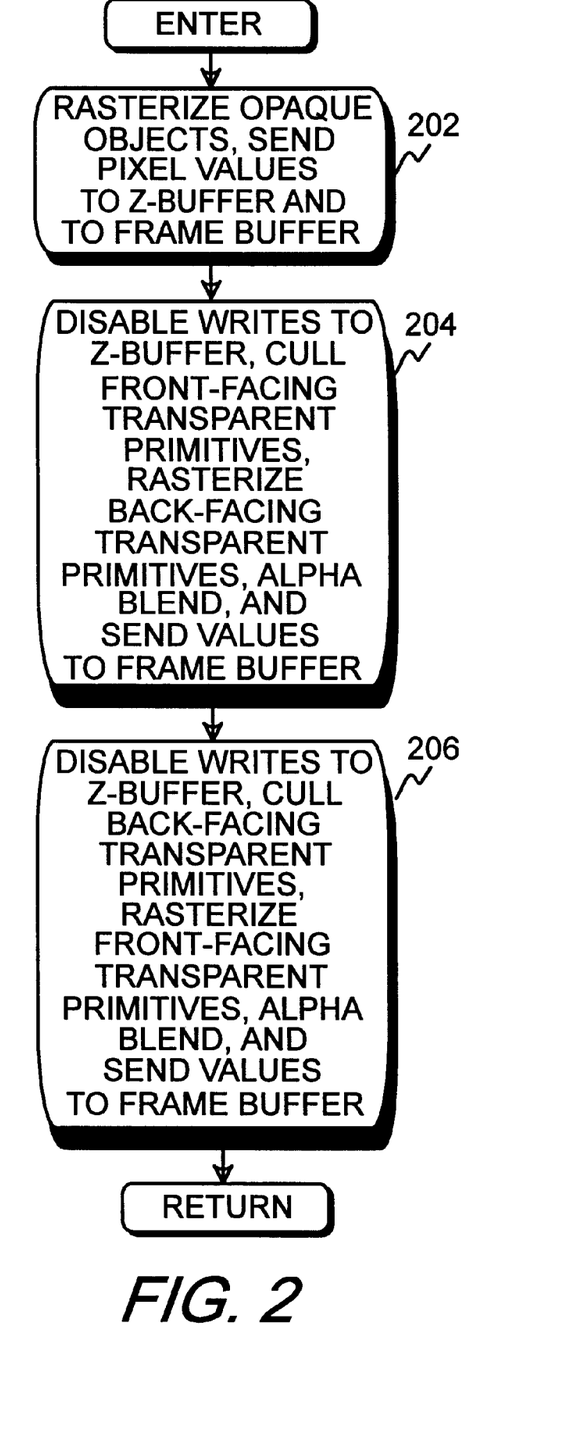
FIG. 2 shows a flow chart of a three pass method of rendering opaque and transparent objects.

FIG. 2 shows a flow chart of a three pass method of rendering opaque and transparent objects. This method is contained within the transparency rendering method 124 and is called by the user application 122. Referring now to FIG. 2, in block 202 a first pass processes all opaque objects in the scene. Primitives of the objects are rasterized and values for all pixels are sent to the z-buffer 126 (FIG. 1) and the frame buffer 120 (FIG. 1).

Figure 3:
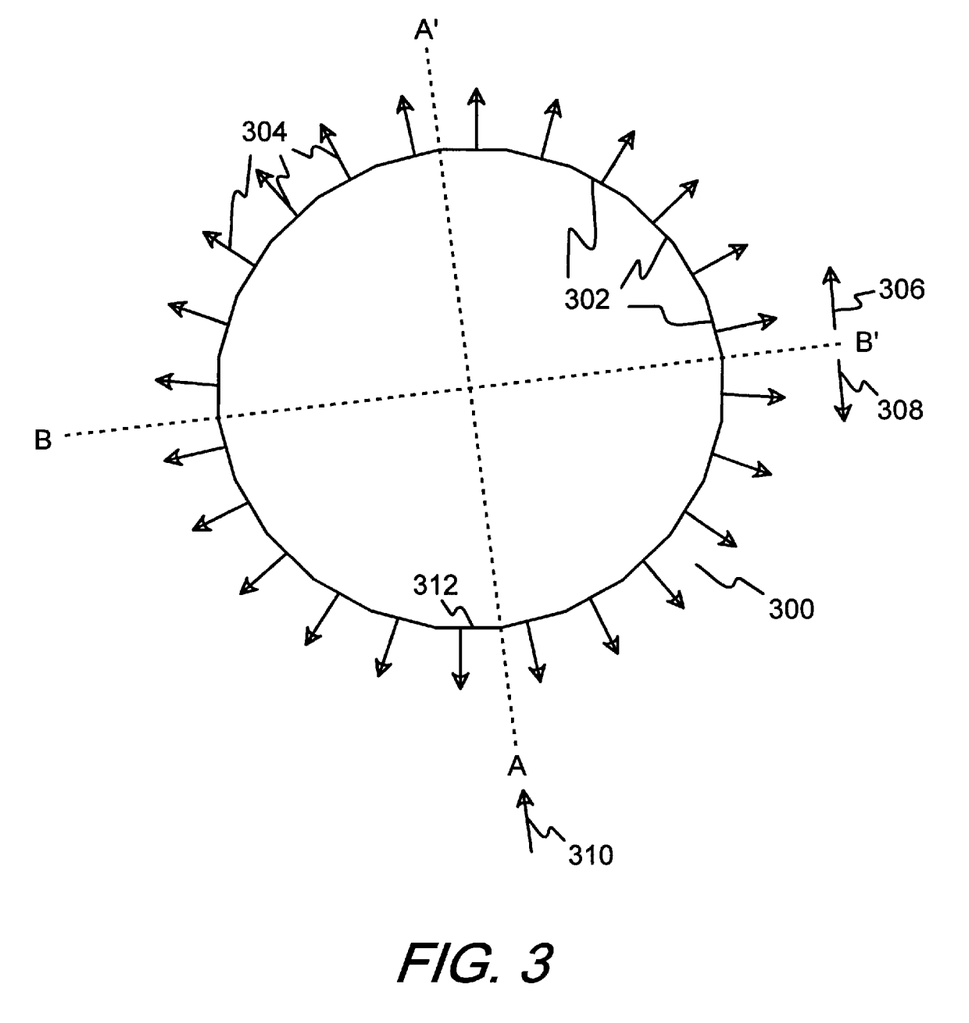
FIG. 3 shows a top view of back-facing and front-facing primitives of a transparent object.

In block 204 a second pass first disables writes to the z-buffer. All front-facing primitives of transparent objects are culled. Back-facing primitives of all transparent objects are rasterized and processed. FIG. 3 demonstrates this method of back-face processing.

Referring now to FIG. 3, a top view of a circular transparent object 300 is shown. The circular transparent object 300 is made up of a series of primitives 302 that appear as edges in this top view. This figure is for illustrative purposes only, since in practice, many more primitives would be used to more closely approximate a circular shape.

The front side of each primitive 302 is indicated by a surface normal arrow 304 which extends outward from each primitive 302. To render the circular transparent object 300, where the viewpoint is in the direction of directional arrow 310, the typical procedure is to start at primitive 312 and traverse around circular object 300 from primitive to primitive. Those primitives whose surface normal arrows 304 point in generally the same direction as directional arrow 306 but no greater than a declination of 90° off of imaginary line A–A' are back-facing. Those primitives whose surface normal arrows 304 point in generally the same direction as directional arrow 308 but no greater than a declination of 90° off of imaginary line A–A' are front-facing. One skilled in the art will recognize that as the point of view of an object in a scene changes, those primitives that were front-facing or back-facing in the old view may change in the new view.

As circular transparent object 300 is traversed starting from primitive 312, one-half of the circular transparent object 300 is rasterized in front to back order (going from A to A'), and the other half is rasterized in back to front order (going from A' to A). This is not a problem when rendering solid objects, because all back-facing primitives are culled since, in a solid object, they are not visible. With transparent objects, however, this ordering produces an incorrect color in the buffer because back-facing primitives are not culled. When the transparent object is rasterized and displayed, the result is a break in appearance down the middle of the visible surface of the transparent object due to the difference in the ordering of each half.

To solve this problem, the present invention processes circular transparent object 300 in two passes. The first pass rasterizes and alpha blends pixels of all back-facing primitives 302, which are those primitives 302 on the A' side of imaginary line B–B' whose surface normal arrows 304 point generally in the direction of directional arrow 306. The second pass rasterizes and alpha blends pixels of all front-facing primitives 302, which are those primitives 302 on the A side of imaginary line B–B' whose surface normal arrows 304 point generally in the direction of directional arrow 308. This procedure eliminates the unsightly seams present in conventional methods because the seams are now located at the edges of the rendered object, and are thus not discernible. Another advantage is that for each object, a back to front ordering of all individual primitives of the transparent object has been achieved.

Referring back to FIG. 2 and block 204, in the process of rasterizing the back-facing primitives of all transparent objects, z-buffer comparisons are made to determine whether to place data in the frame buffer for each transparent object. Transparent objects with z-values that indicate they are behind an opaque object are culled. Transparent objects whose z-values indicate they are in front of all opaque objects will be processed. Alpha values for all transparent objects to be rendered are used to blend the transparent object's pixel color with the current pixel value in the frame buffer.

Figure 4:
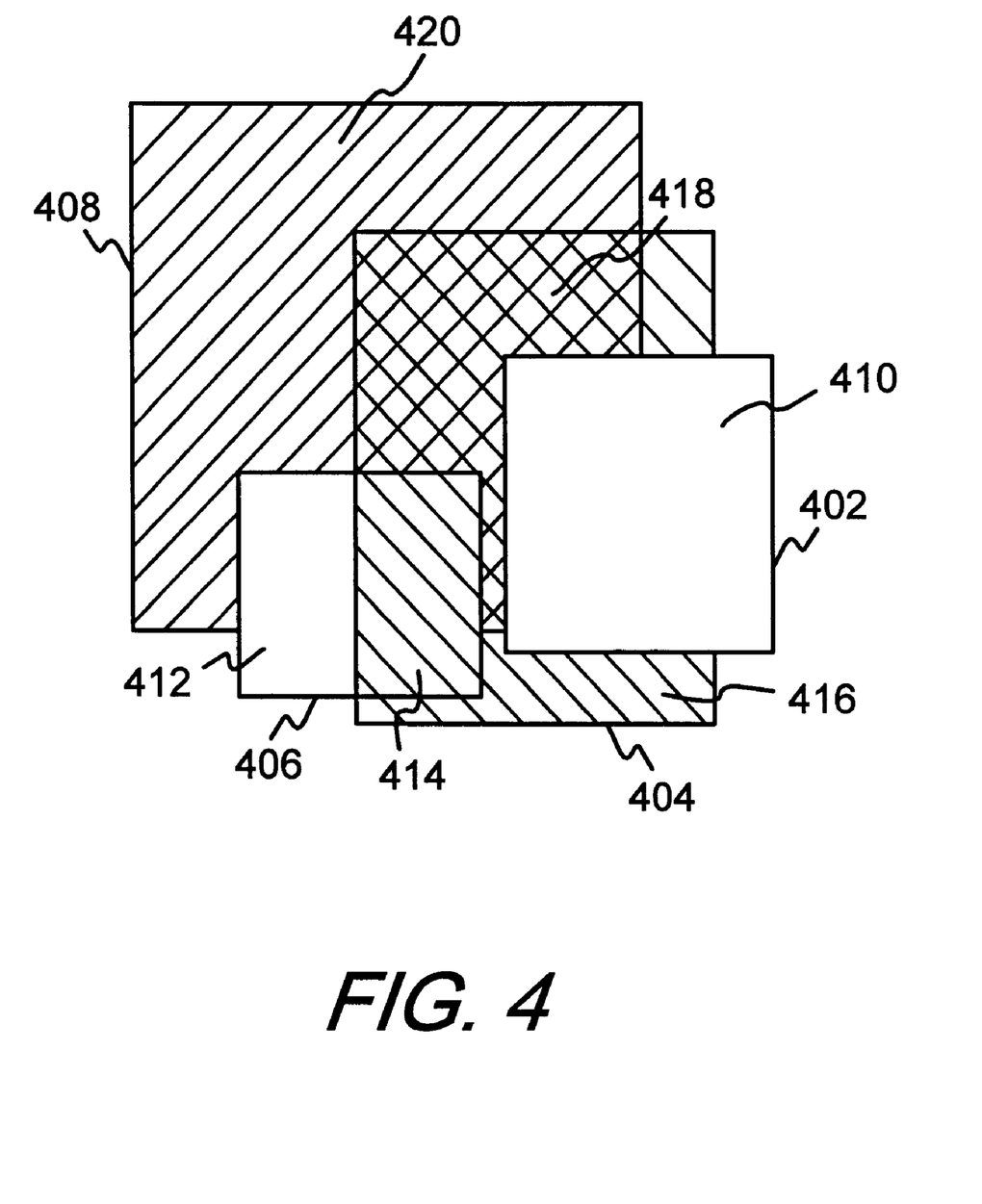
FIG. 4 shows opaque and transparent objects overlaying each other.

FIG. 4 shows a front view of opaque and transparent planar objects overlaying each other as may typically be viewed on a graphic display. One skilled in the art will recognize that three dimensional objects may also be displayed in such overlaying fashion, and that objects may also intersect with one another. Referring now to FIG. 4, objects 402 and 406 are opaque, and objects 404 and 408 are transparent. One skilled in the art will recognize that transparent objects can have varying degrees of transparency, which is indicated by an alpha value as discussed above. The differing degrees of transparency in objects 404 and 408 are represented by different cross hatching patterns.

Object 402 overlays parts of objects 404 and 408. Object 404 overlays parts of objects 406 and 408. Object 406 overlays part of object 408. Object 408 does not overlay any other objects.

A front-most surface 410 of opaque object 402 completely blocks out those portions of objects 404 and 408 that it overlays, thus the front-most surface is completely visible.

A left front-most surface 412 and a right front-most surface 414 of object 406 completely block out that portion of object 408 that object 406 overlays, thus the left front-most surface 412 of object 406 is completely visible. The right front-most surface 414 of object 406 is visible through front-most surface 416 of transparent object 404 subject to the alpha value for each pixel inherent in object 404.

Front-most surface 420 of object 408 is visible subject to its alpha value for each pixel. There is a portion of a front-most surface 420 of object 408 that is overlaid by a front-most surface 416 of object 404. That portion of front-most surface 416 of object 404 that overlays the front-most surface 420 of object 408 that is not blocked by front-most surface 410 of object 402 and left front-most surface 412 and right front-most surface 414 of object 406 is shown by surface area 418 and is indicated by a combined cross hatching pattern. Surface area 418 is visible subject to the combined alpha values of each pixel of object 404 and object 408.

Referring back to FIG. 2, in block 206 a third pass first disables writes to the z-buffer. All back-facing primitives of transparent objects are culled. Front-facing primitives of all transparent objects are rasterized as discussed above in relation to FIG. 3. Alpha values for all transparent objects to be rendered are used to blend the transparent object's pixel color with the current pixel value in the frame buffer. The resulting pixel color values are sent to the frame buffer as discussed above in relation to FIG. 4.

This three pass scene rendering method provides a much more accurate and pleasing visual image than the prior art screen-door method. This three pass scene rendering method eliminates unsightly seams because after rendering any discrepancy occurs at the edges of an object where they are not apparent. Though individual transparent objects may not be processed in a back to front order relative to each other, the primitives of each transparent object are rendered in a back to front order. This three pass scene rendering method is faster by an order of magnitude over the prior art full depth sort, which processes all objects in back to front order.

Figure 5:
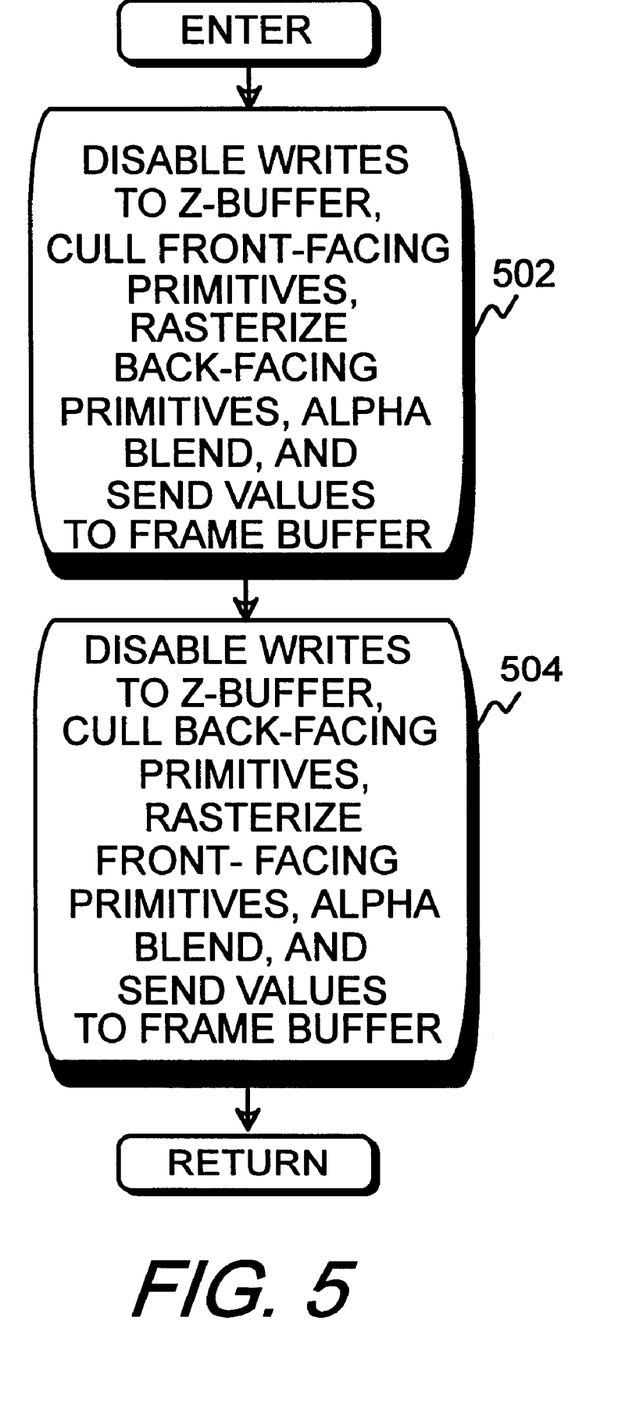
FIG. 5 shows a flow chart of a two pass method of rendering transparent objects.

FIG. 5 shows a flow chart of an embodiment of a two pass method of rendering transparent objects of the present invention. This method is contained within transparency rendering method 124 and is called by user application 122. Referring now to FIG. 5, in block 502 a first pass disables writes to the z-buffer. All front-facing primitives are culled. All back-facing primitives of transparent objects are rasterized as discussed above in relation to FIG. 3. Alpha values for all back-facing primitives of transparent objects to be rendered are used to blend the transparent object's pixel color with the current pixel value in the frame buffer. The resulting pixel color values are sent to the frame buffer as discussed above in relation to FIG. 4.

In block 504, a second pass disables writes to the z-buffer. All back-facing primitives are culled. All front-facing primitives of opaque and transparent objects are rasterized as discussed above in relation to FIG. 3. Alpha values for all front-facing primitives of transparent objects to be rendered are used to blend the transparent object's pixel color with the current pixel value in the frame buffer. The resulting pixel color values are sent to the frame buffer as discussed above in relation to FIG. 4. With this two pass approach, all front-facing primitives are processed last giving a more accurate front to back rendering and a more visually appealing image than the prior art screen-door method.

Figure 6:
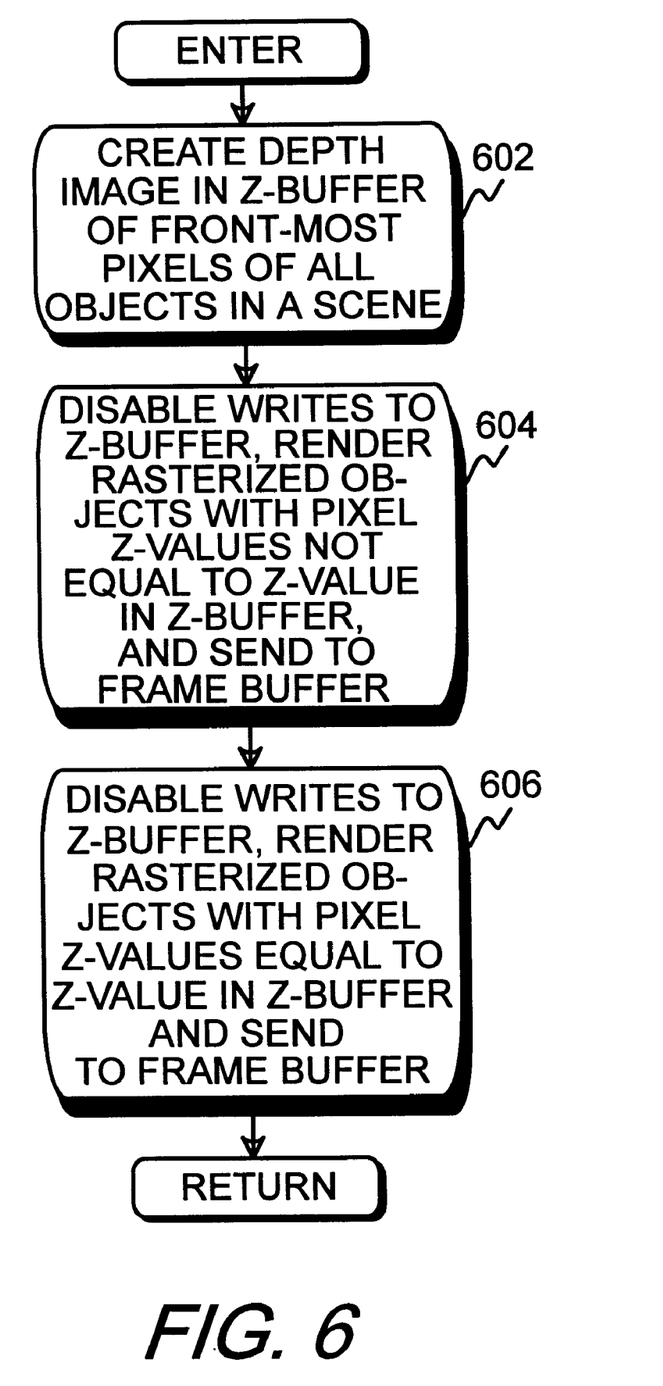
FIG. 6 shows a flow chart of a three pass method of rendering transparent objects.

FIG. 6 shows a flow chart of an embodiment of a three pass method of rendering only transparent objects of the present invention. This method is contained within transparency rendering method 124 and is called by user application 122. Referring now to FIG. 6, in block 602 a first pass establishes a depth image of the front-most primitives of all the objects in a scene and stores their pixel values in the z-buffer, which creates a shell of the front-most primitives of objects in a scene. This pass is done by rasterizing the objects, but discarding the frame buffer data and storing only the z-buffer values for the pixels of the front-most objects.

In block 604, a second pass first disables writes to the z-buffer. Next, all rasterized primitives of objects whose pixel's z-values do not equal the z-value in the z-buffer are processed and image values sent to the frame buffer. This renders everything behind the front-most objects in the scene since the front-most objects were established by block 602.

In block 606, a third pass first disables writes to the z-buffer. Next, all rasterized primitives of objects whose pixel's z-values equal the z-value in the z-buffer are processed and image values sent to the frame buffer. This renders all the front-most objects in the scene of the shell created in block 602. This method provides a more correct image, since the front-most primitives are the most critical visually, and are rendered last.

Figure 7:
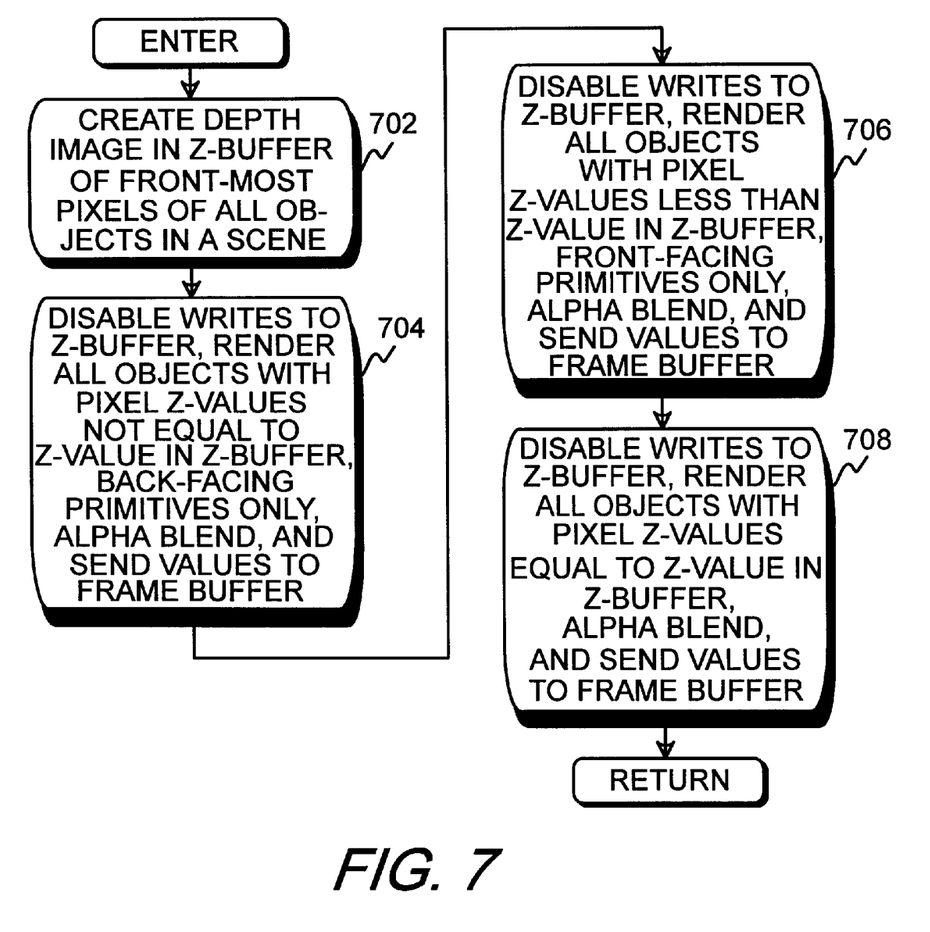
FIG. 7 shows a flow chart of a four pass method of rendering transparent objects.

FIG. 7 shows a flow chart of an embodiment of a four pass method of rendering only transparent objects of the present invention. This method is contained within transparency rendering method 124 and is called by user application 122. Referring now to FIG. 7, in block 702 a first pass establishes a depth image of the front-most primitives of all the objects in a scene and stores their pixel values in the z-buffer in the same manner as described above with respect to block 602. This creates a shell of the front-most primitives of objects in a scene.

In block 704, a second pass first disables writes to the z-buffer. Next, all back-facing primitives of objects whose pixel z-values do not equal the corresponding z-value in the z-buffer are processed. Alpha values for all back-facing primitives of transparent objects to be rendered are used to blend the transparent object's pixel color with the current pixel value in the frame buffer. The resulting pixel color values are sent to the frame buffer as discussed above in relation to FIG. 4. This renders all back-facing primitives of objects that are not part of the front shell.

In block 706, a third pass first disables writes to the z-buffer. Next, all front-facing primitives of objects whose pixel z-values do not equal the corresponding z-value in the z-buffer are processed. Alpha values for all front-facing primitives of transparent objects to be rendered are used to blend the transparent object's pixel color with the current pixel value in the frame buffer. The resulting pixel color values are sent to the frame buffer as discussed above in relation to FIG. 4. This renders all front-facing primitives of objects that are not part of the front shell.

In block 708, a fourth pass first disables writes to the z-buffer. Next, all objects whose z-values equal the z-value of the z-buffer are processed. Alpha values for all these front-most object primitives of transparent objects to be rendered are used to blend the transparent object's pixel color with the current pixel value in the frame buffer. The resulting pixel color values are sent to the frame buffer as discussed above in relation to FIG. 4. This renders all the front-most objects in the scene of the shell created in block 702.

This scene rendering method also provides a more correct image since the front-most primitives are the most critical visually, and are rendered last. In addition, all objects have their back-facing primitives rendered before their front-facing primitives, which makes each object more visually pleasing and correct, since each pixel of the individual object is rendered in the internally correct back to front order.

Having described a presently preferred embodiment of the present invention, it will be understood by those skilled in the art that many changes in construction and widely differing embodiments and applications of the invention will suggest themselves without departing from the scope of the present invention, as defined in the claims. The disclosures and the description herein are intended to be illustrative and are not in any sense limiting of the invention, defined in scope by the following claims.

What is claimed is:

1. A method for rendering opaque objects and transparent objects in at least one portion of a scene for graphic display in a computer system, said method comprising the steps of:
   (a) rasterizing primitives of said opaque objects and sending depth values for pixels of said rasterized primitives to a z-buffer and sending image data for said pixels of said rasterized primitives to a frame buffer in said computer system;
   (b) processing primitives of said transparent objects, said processing comprising the steps of
      (b1) disabling writes to said z-buffer,
      (b2) culling all front-facing primitives of said transparent objects,
      (b3) rasterizing all back-facing primitives of said transparent objects to yield back-facing primitive pixels, and culling all said back-facing primitive pixels when depth values of said back-facing primitive pixels indicate that said back-facing primitive pixels are located behind at least one of said opaque objects, and
      (b4) alpha blending image data of remaining back-facing primitives with said image data in said frame buffer, and sending said alpha blended image data of said remaining back-facing primitives to said frame buffer, and
   (c) processing said primitives of said transparent objects, said processing comprising the steps of
      (c1) disabling writes to said z-buffer,
      (c2) culling said back-facing primitives of said transparent objects,
      (c3) rasterizing all front-facing primitives of said transparent objects to yield front-facing primitive pixels, and culling all said front-facing primitive pixels when depth values of said front-facing primitive pixels indicate that said front-facing primitive pixels are located behind at least one of said opaque objects, and
      (c4) alpha blending image data of remaining front-facing primitives with said image data in said frame buffer, and sending said alpha blended image data of said remaining front-facing primitives to said frame buffer.

2. A method for rendering transparent objects in at least one portion of a scene for graphic display in a computer system, said method comprising the steps of:
   (a) processing primitives of said transparent objects, said processing comprising the steps of
      (a1) disabling writes to a z-buffer, (a2) culling all front-facing primitives of said transparent objects, and (a3) rasterizing back-facing primitives of said transparent objects to yield back-facing primitive pixels and alpha blending image data of said rasterized back-facing primitive pixels of said transparent objects and sending said alpha blended image data of said rasterized back-facing primitive pixels to a frame buffer; and (b) processing said primitives of said transparent objects, said processing comprising the steps of (b1) disabling writes to said z-buffer, (b2) culling all back-facing primitives of said transparent objects, and (b3) rasterizing front-facing primitives of said transparent objects to yield front-facing primitive pixels and alpha blending image data of said rasterized front-facing primitive pixels of said transparent objects and sending said alpha blended image data of said rasterized front-facing primitive pixels to said frame buffer.

3. A method for rendering transparent objects in at least one portion of a scene for graphic display in a computer system, said method comprising the steps of:

(a) creating a shell of front-most primitives of said transparent objects by rasterizing said transparent objects to establish a depth image of said front-most primitives of said transparent objects in a z-buffer, said rasterizing comprising determining z-values of pixels of said front-most primitives of said transparent objects, storing said z-values of said pixels in said z-buffer, and discarding all frame buffer data;

(b) disabling writes to said z-buffer, rasterizing said transparent objects, and alpha blending image data of pixels of said rasterized transparent objects when z-values of said pixels are not equal to said z-values stored in said z-buffer; and (c) disabling writes to said z-buffer, rasterizing said transparent objects, and alpha blending image data of pixels of said rasterized transparent objects when z-values of said pixels equal said z-values stored in said z-buffer.

4. The method of claim 3 further comprising performing the following steps (b1) and (b2) in place of step (b):

(b1) disabling writes to said z-buffer, rasterizing all back-facing primitives of said transparent objects, and alpha blending image data of pixels of said rasterized back-facing primitives when z-values of said pixels are not equal to said z-values stored in said z-buffer; and (b2) disabling writes to said z-buffer, rasterizing all front-facing primitives of said transparent objects, and alpha blending image data of pixels of said rasterized front-facing primitives when said z-values of said pixels are not equal to said z-values stored in said z-buffer.

* * * * *